US005791221A

United States Patent [19]

Krupica et al.

[11] Patent Number: 5,791,221

[45] Date of Patent: Aug. 11, 1998

[54] METHOD AND APPARATUS FOR BUFFERING MEDIA

[75] Inventors: Libor N. Krupica, Methuen; Robert A. Goodwin, Topsfield; Paul W. Morgan, Medford, all of Mass.

[73] Assignee: Agfa Division, Bayer Corporation, Wilmington, Mass.

[21] Appl. No.: 570,148

[22] Filed: Dec. 11, 1995

Related U.S. Application Data

[62] Division of Ser. No. 106,961, Aug. 16, 1993, abandoned.

[51] Int. Cl.[6] .................... G03B 29/00

[52] U.S. Cl. .................... 83/367; 355/28; 355/29

[58] Field of Search .................... 83/367, 369; 355/27, 355/28, 29

[56] References Cited

U.S. PATENT DOCUMENTS

| | | | |
|---|---|---|---|
| 4,639,118 | 1/1987 | Kogane et al. | 355/29 |
| 4,723,153 | 2/1988 | Kogane | 355/29 |
| 4,801,973 | 1/1989 | Takagi et al. | 355/27 |
| 4,837,601 | 6/1989 | Nakane et al. | 355/28 |
| 4,903,100 | 2/1990 | Kogane et al. | 357/27 |
| 5,181,066 | 1/1993 | Ozawa et al. | 355/29 |
| 5,186,453 | 2/1993 | Kühnert | 271/270 |

FOREIGN PATENT DOCUMENTS

| | | |
|---|---|---|
| 0 004 095 | 9/1979 | European Pat. Off. . |
| 0 183 982 | 6/1986 | European Pat. Off. . |
| 37 18 644 | 12/1987 | Germany . |
| 37 19 998 | 12/1987 | Germany . |
| 2 100 882 | 1/1983 | United Kingdom . |
| 2 128 593 | 5/1984 | United Kingdom . |

OTHER PUBLICATIONS

English Abstract of Japanese 62-70155 pub. Mar. 1987.

*Primary Examiner*—Maurina T. Rachuba
*Attorney, Agent, or Firm*—Julie A. Krolikowski; Edward L. Kelley

[57] ABSTRACT

A media buffer capable of buffering two lengths of media, is fed a first length of media from an imagesetter at a first speed, and releases the media to a processor at a second speed. An input media sensor senses the media entering the buffer. Drive rollers take up the leading edge of the media at the imagesetter speed. Shortly thereafter a signal from an output media sensor located between the drive rollers and the processor, opens an input door to an input bin and stops the drive rollers. The incoming media continues to be fed by the imagesetter forming a first slack loop within the input bin. The imagesetter signals the buffer that the media has been cut, thereby actuating drive rollers to advance the media at the processor speed to a pair of rollers in the processor. A signal from the processor sensor opens an output door to an output bin. The drive rollers increase speed to transport the first piece of media from the input bin to the output bin thereby forming a second slack loop. The input media sensor senses the trailing edge of the first length of media exiting the input bin and signals the input door to close. At this point a second length of media may begin feeding from the imagesetter into the buffer. When the output bin is clear of the media the processor sensor signals the buffer to close the output door.

5 Claims, 9 Drawing Sheets

METHOD AND APPARATUS FOR BUFFERING MEDIA

This application is a divisional of application Ser. No. 08/106,961 filed Aug. 16, 1993, now abandoned.

BACKGROUND OF THE INVENTION

This invention relates to the movement of sheets of material from a first machine operating at a first speed to a second machine operating at a second speed and provides a method and apparatus to allow each machine to operate at its own speed with no idle time of either machine. An example is automated photographic imaging and developing. The forming of a photographic latent image in a first machine by exposing photographic material to exposure illumination and the subsequent chemical developing of the latent image in a second machine that develops, fixes, and washes the latent image forming a silver image, are consecutive processes, which usually occur at different operating speeds.

The diffusion transfer reversal (DTR) process as described in U.S. Pat. No. 2,352,014 is a photo-chemical process of exposing a photosensitive material to electromagnetic radiation thereby forming a latent image and then chemically processing the latent image in a subsequent step, thereby forming a silver image.

Similar photochemical processing methods are used for example in photo finishing applications and in electronic prepress systems. In such applications film images are produced for transfer to lithographic plate materials or for imaging photolithograph plates directly.

In electronic prepress systems, images to be printed by offset printing means are scanned from photographic negatives and digitized, assembled and edited electronically at a workstation, and then transmitted to a raster image processor or "RIP" for half-tone screening and image rasterization. The "RIP image", that is, the rasterized image to be printed, is then transmitted from the RIP to an imagesetter for photographic or film recording. Such an electronic prepress system is described in U.S. Pat. No. 4,004,079 and is available for example from Miles, Inc. under the Trademark "COLORSCAPE".

An imagesetter includes a supply of unexposed photosensitive material, a recording support surface, and an image exposing system for forming the image to be recorded according to the RIP image data. The image exposing system may employ a laser beam, a cathode ray tube (CRT), an LED emitter or the like as a radiation source. The material passes from a supply roll or web to the recording support surface at which point the photosensitive material is exposed to the recording radiation, forming a latent image. The speed of the web movement is determined by the image resolution which may vary from image to image. Numerous images may be recorded onto the web consecutively, each image having a variable length of unexposed web there between which is controlled by the imagesetter controller. The exposed material advances onto a take-up cassette that takes up the entire length of recording material and maintains it in light-tight environment. The take-up cassette is then removed and transported from the imagesetter to the film processor where the chemical processing occurs at a constant speed. The processor passes the material at a constant speed so that the chemical processing necessary for developing and fixing occurs at predetermined rates.

According to this system, the web is wound onto the take-up cassette at the speed of the imagesetter which may vary from image to image, and after transportation, is removed from the take-up cassette at the constant speed of the processor. Additionally, after the developing occurs in the processor, the entire length of recording material must be cut into sheets to separate the images. This requires two manual steps that slow operation.

Consequently, a single phase buffer was developed that provides a bridge from the imagesetter directly to the processor, similar to UK Patent Application GB 2,100,882. Here, the RIP image is recorded onto the web material, advanced to a cutter within the imagesetter, cut, and fed into the bridge. The light-tight single phase buffer receives a latent image on a cut sheet of the web material at the imagesetter speed, and then the processor takes the sheet from the bridge at the processor operating speed. This overcomes the problem of transporting the take up cassette and cutting the images manually. However, the single phase buffer is limited to transferring only one sheet at a time. Additionally, the imagesetter remains idle while the entire first sheet is processed since the bridge must be completely cleared due to the imagesetter typically running faster than the processor. Although this method provides automation, it still slows the overall operation.

Another disadvantage of the single phase buffer is that the length of the film that can be taken into the buffer is limited to the approximate length of the bridge. Therefore, after the imaging is complete, the film is advanced to the cutter, cut, and then delivered to the buffer. The end of the image is advanced from the imaging point to the cutting point within the imagesetter, during which time no imaging occurs. The film is then cut, leaving a large unexposed area of film at the leading edge of the web from behind the cutter back to the imaging point; a result of the advancement of the film to be cut from the web. Because this cycle of advancing and cutting occurs often, there are frequent unexposed areas of film.

It is accordingly a general object of this invention to minimize unexposed areas of film by buffering longer lengths of film than the single phase buffer, each length having several consecutive images, thereby reducing the frequency of advancing and cutting the film.

Alternatively, a cut may be made between every image. Here, a small gap of unexposed web, or an interimage space, is left in between images as a designated cutting location. As the gap moves from the imaging point to the cutting point, the imagesetter is forming. When the gap arrives at the cutter, the imaging is suspended temporarily to cut at the approximate center of the gap. By this method, large unexposed areas are eliminated, and the delay in imaging is virtually instantaneous.

A general object of this invention is to provide communication between the buffer, imagesetter and film processor. Communication between the buffer, imagesetter and processor allows for two sheets of film to be buffered consecutively and automatically without the imagesetter standing idle while waiting for the buffer to clear completely.

It is a specific object of the invention to maximize the operating time of the imagesetter. The imaging activity is interrupted for short periods of time due to the buffer. The buffer transports the media from a first storage space to a second storage space at a speed much faster than the speed at which the imaging occurs, thus imaging may continue shortly thereafter.

It is another specific object of the invention to provide an internal buffer integral with an imagesetter. The buffer is designed to fit in the space of and replace the take-up cassette of the imagesetter thereby allowing an operator to operate the imagesetter with or without a processor, if so desired. This reduces the number of components in the photographic imaging and developing system with speed differential compensation and reduces the required floor space of the overall system which is a critical consideration in many prepress installations.

It is a specific object of the invention to prevent a pair of drive rollers from jerking the film and disrupting the ongoing imaging. The film coming out of the imagesetter may be required to oscillate back and forth in a positive and negative direction relative to its direction of travel because of the imaging requirements or the media transport system. This makes it necessary to provide a preliminary slack in the film before the drive rollers grab the film. Then, if the film is moving in a negative direction at the instant when the drive rollers grab the leading edge the preliminary slack is sufficient to prevent the drive rollers 10 from jerking the film and disrupting the ongoing imaging.

It is another specific objective of the invention to account for the natural curvature of the film. Complicating the step of the drive rollers taking up the film is the inherent natural curvature of the film which is especially pronounced at the leading edge of the web supply roll. To guide the film into the drive rollers, the film is preformed by a curved guide into a shape which will grow into a downward slack loop, when the drive rollers hold the leading edge in place and the film is continuously entering from the imagesetter.

SUMMARY OF THE INVENTION

An apparatus is disclosed for buffering movement of separate sheets of media each with a leading edge and a trailing edge, between a first machine operating at a first speed and a second machine operating at a second speed. In this case, the first machine may include an image exposing device or imagesetter operating at the first speed and the second machine may be a photo-chemical processor operating at the second speed. In such a configuration, the processor, or second speed, is slower than the imagesetter or first speed which may vary according to the image resolution. Furthermore, the first machine may also include a cutter for cutting separate sheets from a web media.

The apparatus includes a feeding device provided by the first machine for feeding the leading edge of a first sheet of media into a buffer at the first speed and a buffer formed by a single pair of drive rollers in constant rolling contact with each other for grabbing the leading edge of the first sheet of media at the first speed and holding the leading edge of the first sheet while the feeding device feeds the first sheet of media into an input bin or a first open space in the buffer. The single pair of drive rollers then advances the leading edge of the first sheet of media out of the buffer to the second machine at the second speed. Upon receiving a signal from the second machine, the single pair of rollers advances the first sheet of media from the first open space to an output bin or second open space at a third speed which is faster than the second speed. This forms a second slack loop in the second open space. At the same time, the leading edge of the first sheet of media is continuously advancing out of the buffer and into the second machine at the second speed.

A communication network is provided between the first machine, the buffer and the second machine for communicating signals from the buffer to either the first or second machine or to pass information between the second machine and the first machine. Upon completion of advancing the first sheet of media from the first open space to the second open space a signal is sent from the buffer to the first machine to advance a leading edge of a second sheet of media to the single pair of drive rollers while the first sheet of media is advancing out of the buffer to the second machine at the second speed.

The buffer also includes an input sensor for sensing an edge of a sheet of media as it enters the single pair of rollers and an output sensor for sensing an edge of a sheet of media as it exits the single pair of rollers. The input sensor and the output sensor provide a signal to a buffer controller which receives signals from the first machine and the second machine through the communication network.

BRIEF DESCRIPTION OF THE DRAWINGS

The features and objects of the invention will become apparent in the following description taken about the drawings, in which.

DESCRIPTION OF THE PREFERRED EMBODIMENT

Figure 1A:
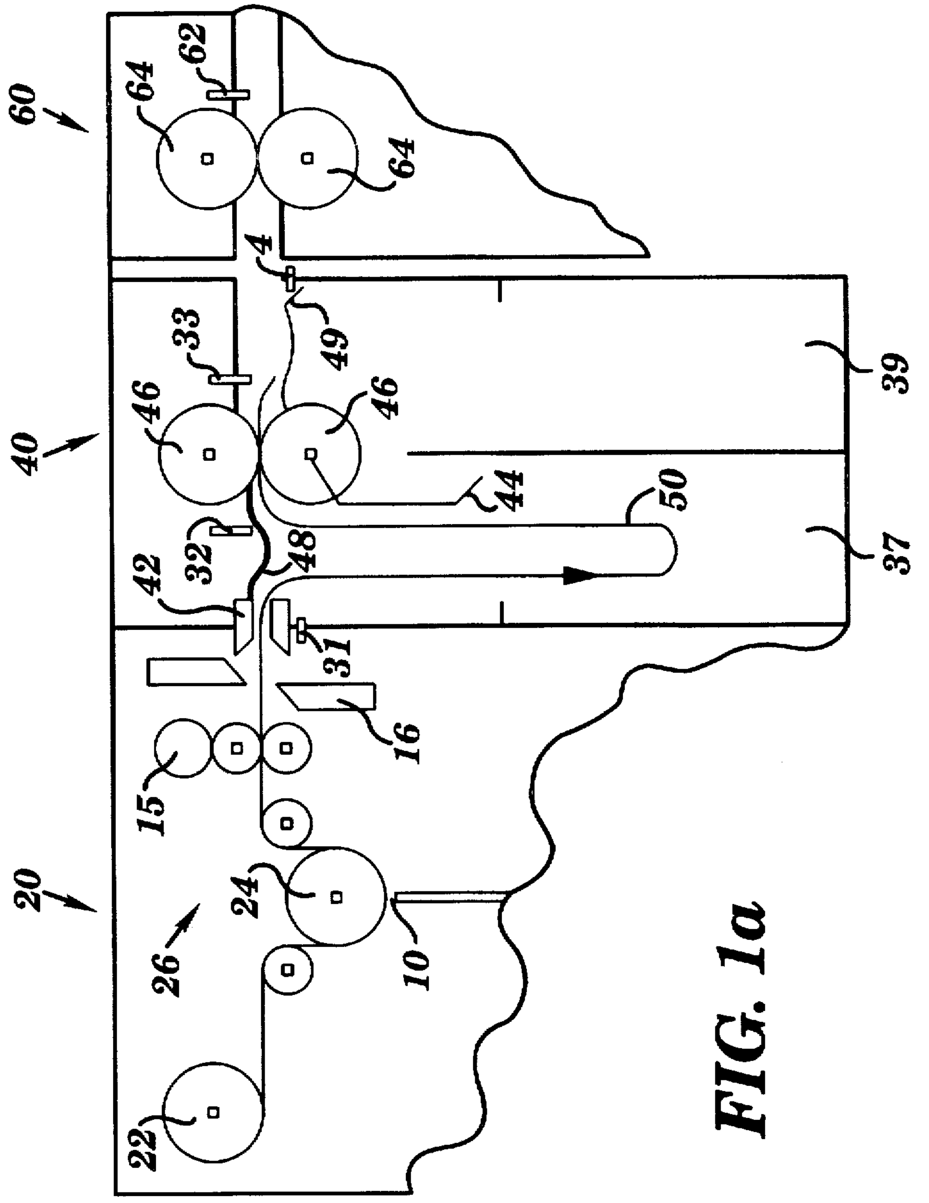
FIGS. 1*a–c* are sequential views of the stages of operation of an internal buffer in combination with an imagesetter and a film processor.

Referring to the FIG. 1*a*, an internal buffer, generally referred to by reference numeral 40, is coupled with an imagesetter, generally referred to by reference numeral 20, and a film processor, generally referred to by reference numeral 60. In the imagesetter 20, a photosensitive material 50, hereinafter referred to as film, is fed from a continuous web supply roll 22 to a recording support surface 24 by a film transport system, generally referred to by reference numeral 26. The film 50 is transported by the film transporting system 26 from the imagesetter 20 into the buffer 40.

Figure 2A:
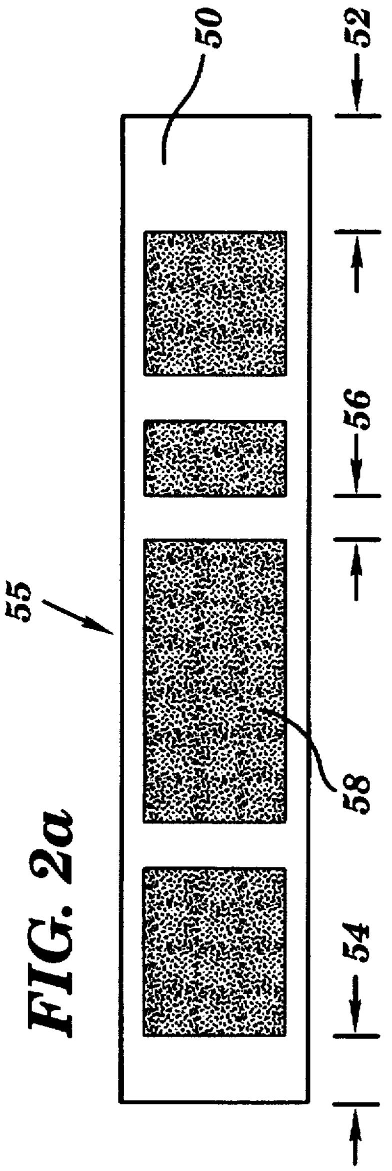
FIG. 2*a* is an illustration showing several latent images on a sample length of media.
Figure 3B:
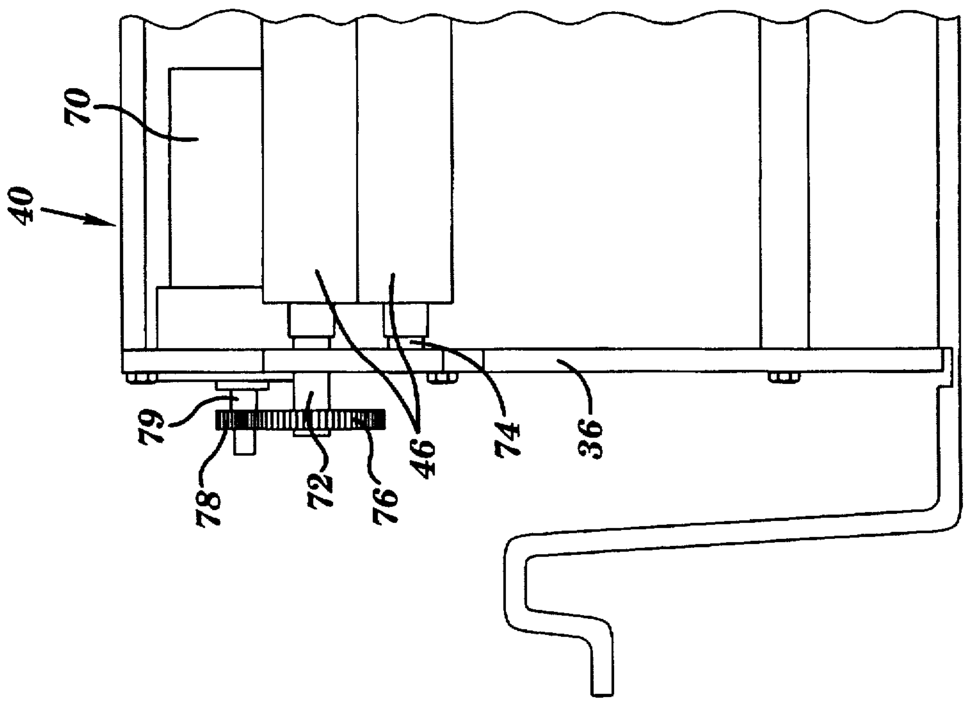
FIG. 3*b* is a partial sectional view of the buffer roller drive mechanism.
Figure 3A:
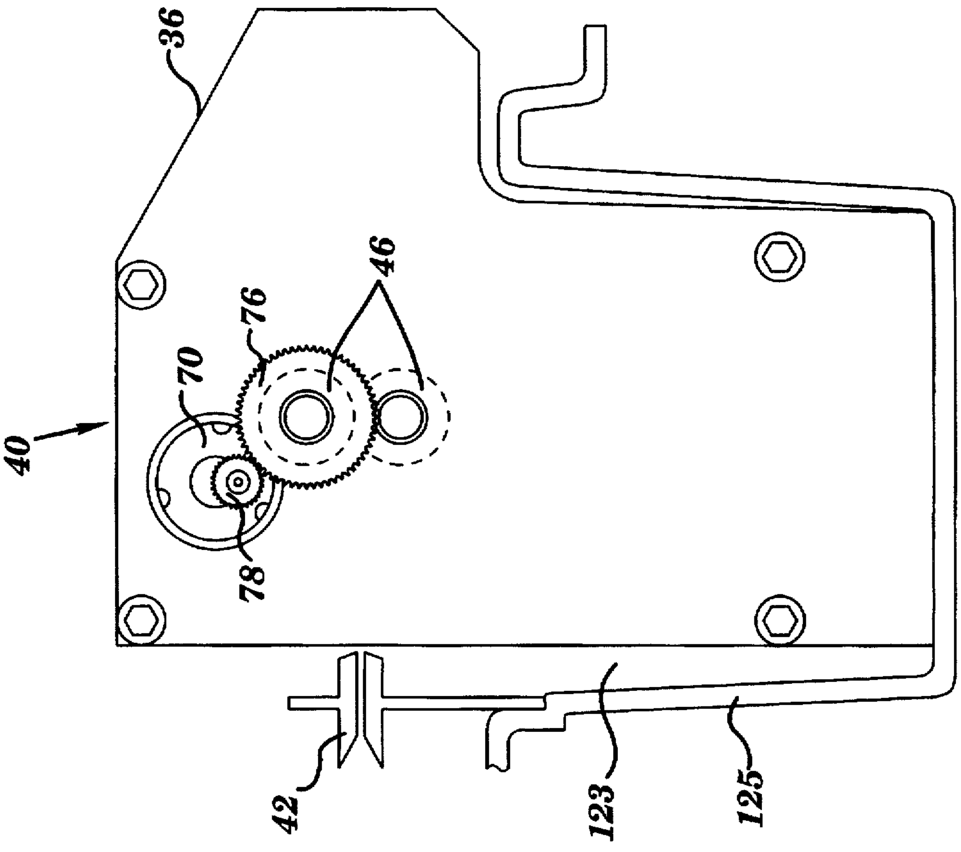
FIG. 3*a* is a partial sectional view of a buffer roller drive mechanism in side elevation.

The leading edge 52 (FIG. 2*a*) of the film is fed into the buffer 40 through film guides 42 (FIG. 3*a*) at the speed of the imagesetter 20. An input door 44 (shown in open position in FIG. 1*a*) is initially in an inclined position to serve as a guide for the film 50. The film 50 moves along the inclined door as the leading edge 52 approaches the nip 34 of the drive rollers 46. At the same time curved guide 48 urges the portion of film 50 immediately behind the leading edge 52 into a preformed downwardly curving shape, i.e. the same shape as the curved guide 48, to counteract the natural curvature of the film 50. A curved output door 49 (shown in closed position in FIG. 1*a*) is in a closed position initially, effectively forming a bridge for the film 50 to be guided over to the film processor 60. An input media sensor 32 senses the leading edge 52 of the film 50 entering the drive rollers 46. A sufficient amount of preliminary slack is fed into the buffer 40 by the imagesetter 20, while the leading edge is being pushed against the nip 34 of the drive rollers 46. Then the drive rollers 46 are actuated to grab the film 50.

The film 50 passes through the drive rollers 46 and reaches an output media sensor 33, and the drive rollers 46 stop, thus holding the leading edge 52 of the film 50 in place as shown in FIG. 1*a*. The input door 44 opens and the preliminary slack grows into a larger slack loop as the leading edge 52 is held between the drive rollers 46 and the film 50 is fed by the imagesetter 20 from the web 22 into an input bin 37. The bin is essentially an open space for the film to form a slack loop and is not limited to the shown configuration.

Figure 1B:
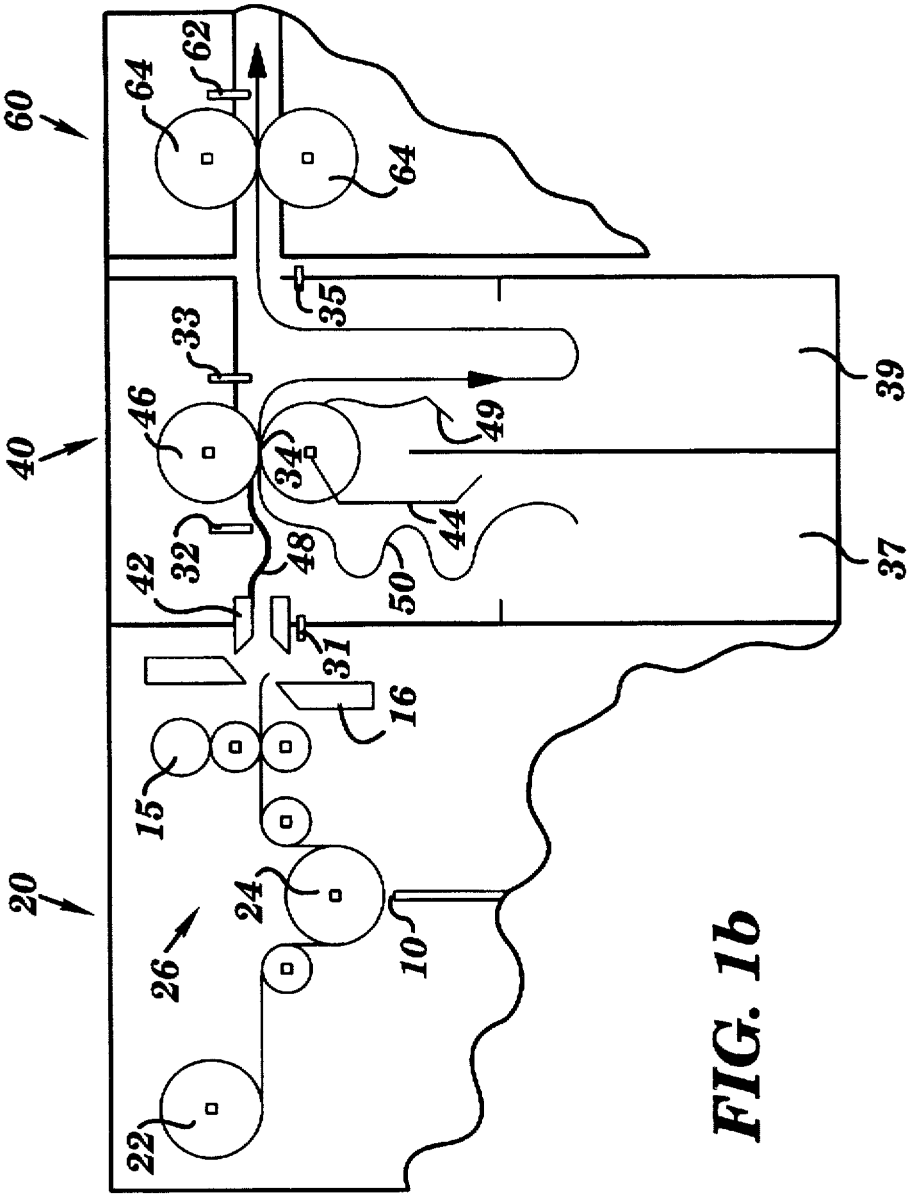
Figure 2B:
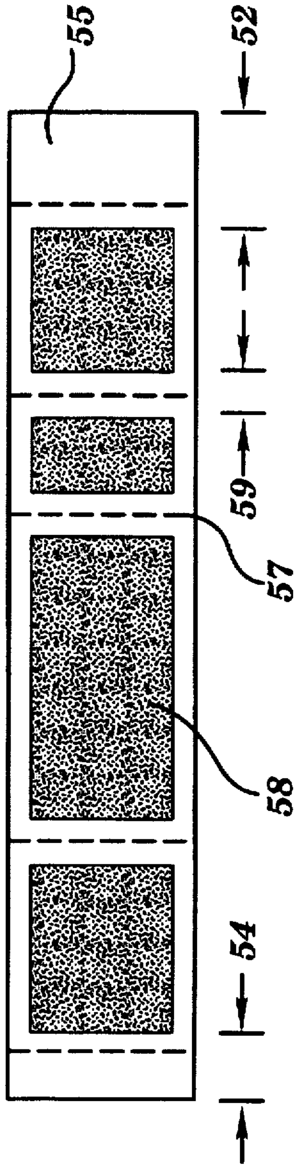
FIG. 2*b* is an illustration showing several latent images cut from a continuous web.

Referring to FIGS. 1*b* and 2*b*, following completion of the image or series of images, the film 50 is cut from the web 22 in the imagesetter 20 by a cutter 28 forming a trailing edge 54 and a sheet generally referred to by reference numeral 55, and a new leading edge on the web 42. The trailing edge 54 of the sheet 55 enters the buffer 40 and drops into the input bin 37.

The drive rollers 46 are actuated to advance the leading edge 52 of the sheet 50 into the processor 60 at the operating speed of the processor 60. A processor input sensor 62 senses the film 50, and the output door drive motor 80 (FIG. 4*a*) opens the output door 49. The drive rollers 46 transport the sheet 55 from the input bin 37 to an output bin 39 at a speed much faster than that of the processor 60 thereby forming a slack loop of film 50 as viewed in FIG. 1*b*. A new leading edge 52 can soon enter the buffer 40. Meanwhile the processor 60 removes the sheet 55 from the output bin 39.

Figure 1C:
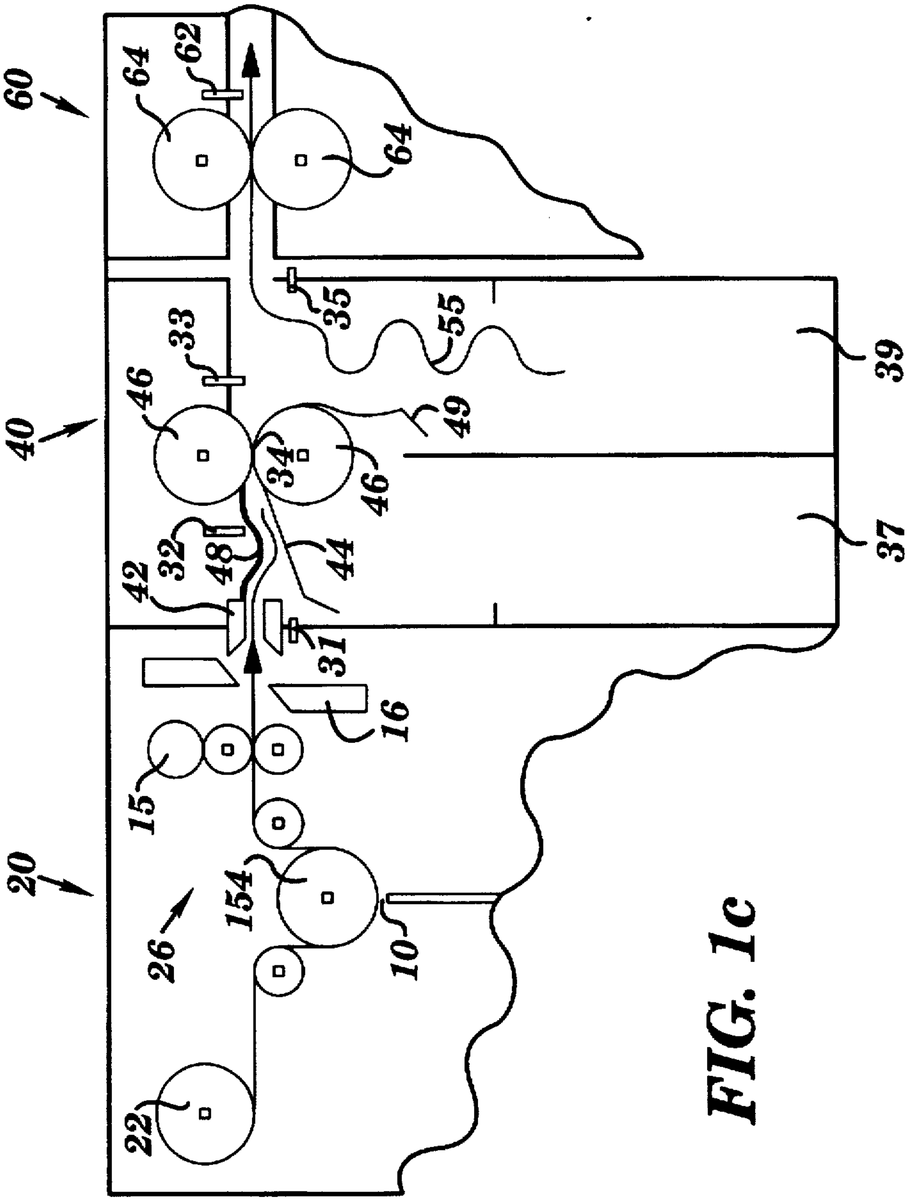

The input media sensor 32 detects the trailing edge 54 (FIG. 2*a*) of the sheet 50 as it leaves the input bin 37. When the trailing edge 54 passes the output media sensor 33, the input door 44 is then closed, and the drive rollers 46 are then stopped. A new leading edge 52 is fed into the buffer 40 while the trailing edge 54 of the first sheet 55 is still being removed from the output bin 39 of the buffer 40, as viewed in FIG. 1*c*. When the processor 60 has removed all the film 50 from the output bin 39, the processor input sensor 62 senses there is no film 50 present and the output door 49 is then closed.

Figure 6B:
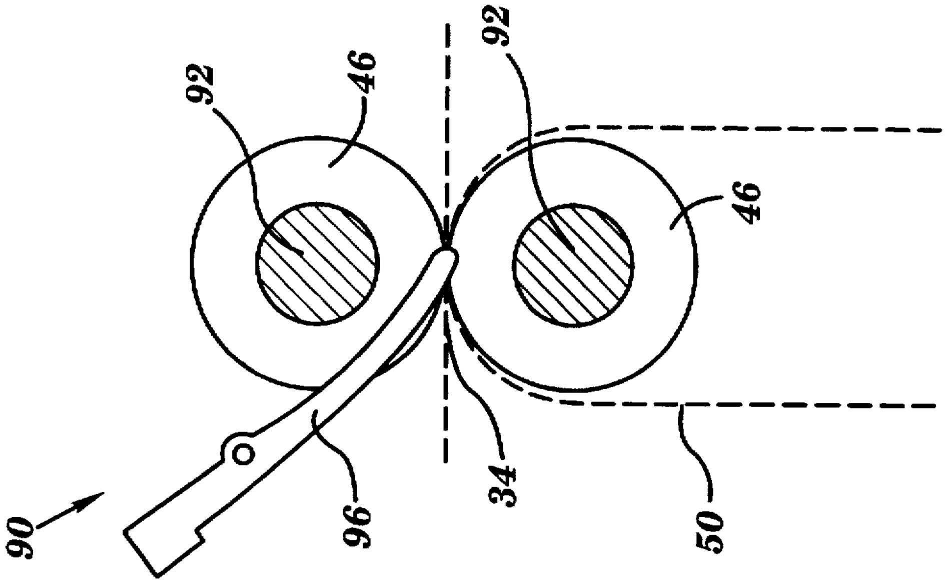
FIG. 6*b* is a cross-sectional view of the pair of drive rollers of FIG. 6*a*.
Figure 6A:
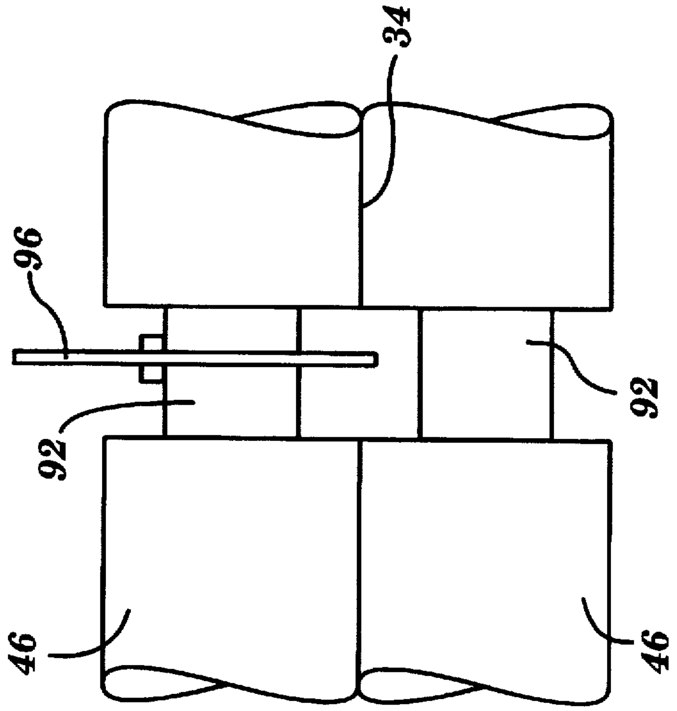
FIG. 6*a* is a view of a pair of drive rollers.

Referring to FIGS. 6*a* and 6*b*, a mechanical switch generally referred to by reference numeral 90, is used in cooperation with the optical input media sensor 32 (FIG. 1*a*) and is located near a reduced diameter portion 92 of the drive roller 46. The switch 90 is set so that lever arm 96 it pivots about point 94 into the reduced diameter portion 92 of the drive rollers 46 when the film 50 reaches it. This allows the film 50 to advance far into the nip 34 of the rollers 46 before the switch 90 is triggered.

Referring to FIGS. 3*a*, 3*b*, 4*a*, 4*b*, and 5 the drive systems for the drive rollers 46 and output door 49 are shown. Beginning with the roller drive mechanism shown in FIGS. 3*a* and 3*b*, a roller drive stepper motor 70 is mounted to buffer housing 36 by conventional means (not shown) with its rotational axis parallel to the rotational axis of the drive rollers 46. The housing 36 rotatably supports two roller shafts 72, 74, that carry the drive rollers 46 nonrotatably. An extended portion of the roller shaft 72 has a gear 76 mounted on it that is driven by a pinion 78 on the motor shaft 79. When the roller drive motor 70 is on, the pinion 78 drives the gear 76 to rotate the roller shaft 72 that rotates its roller 46. The two rollers 46 are mounted such that they are in rolling contact with one another, thus when the shaft 72 is rotated, both rollers 46 are driven simultaneously.

Figure 4B:
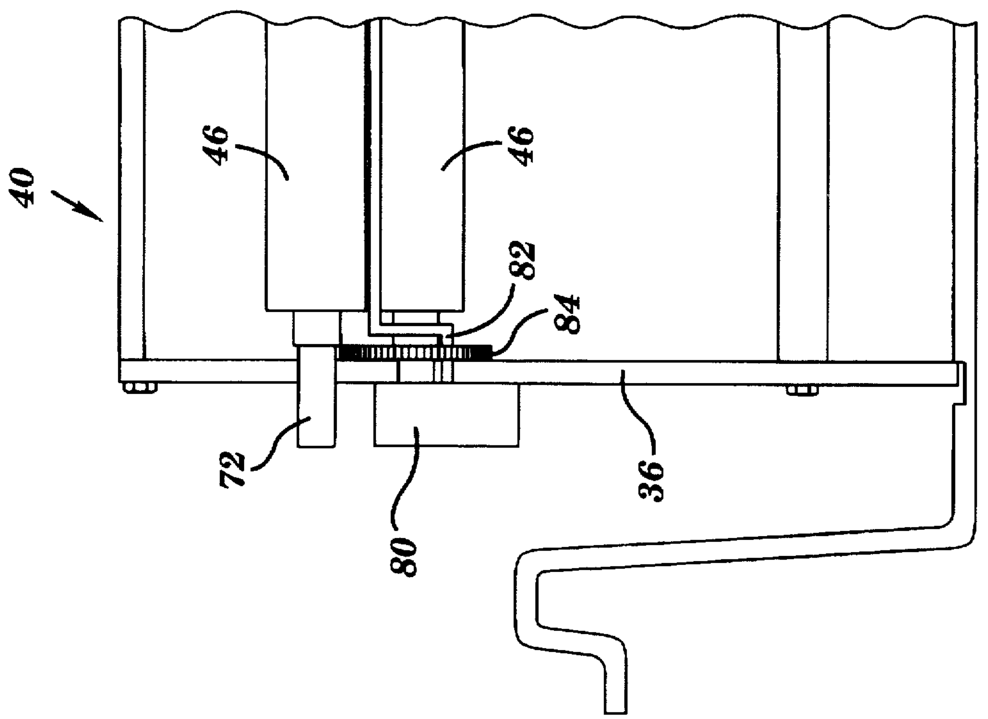
FIG. 4*b* is a partial sectional view of the drive mechanism for the output door.
Figure 4A:
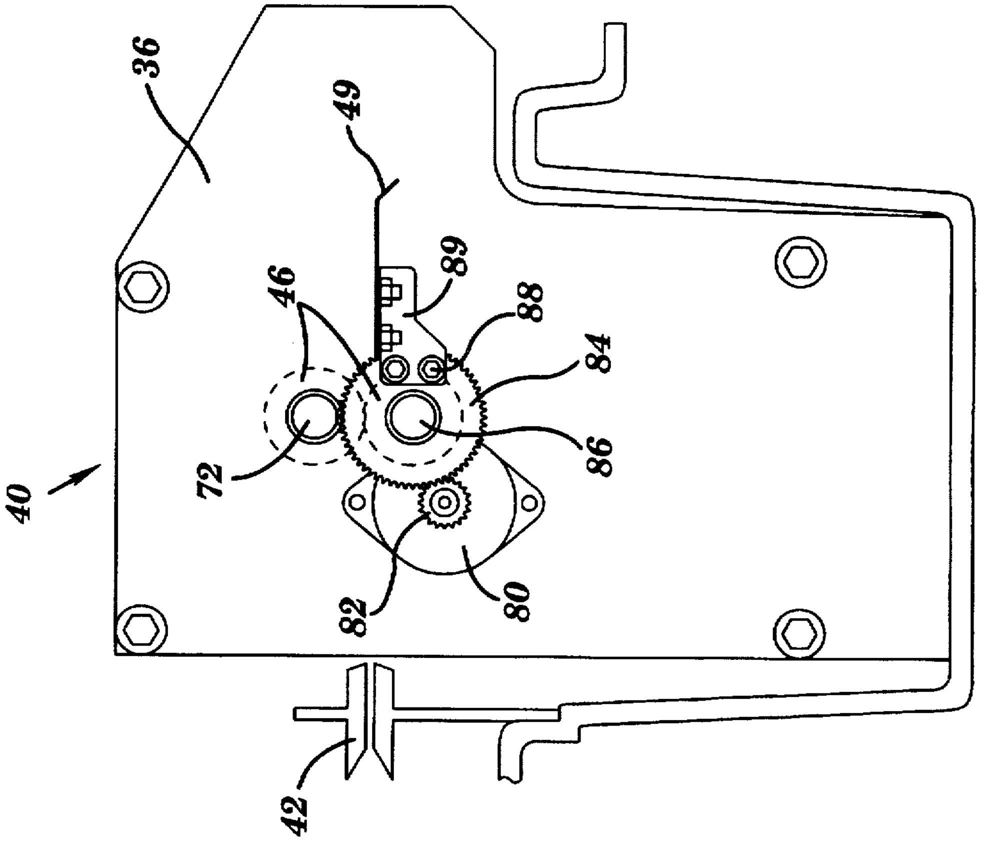
FIG. 4*a* is a partial sectional side view of a drive mechanism for the output door.
Figure 5:
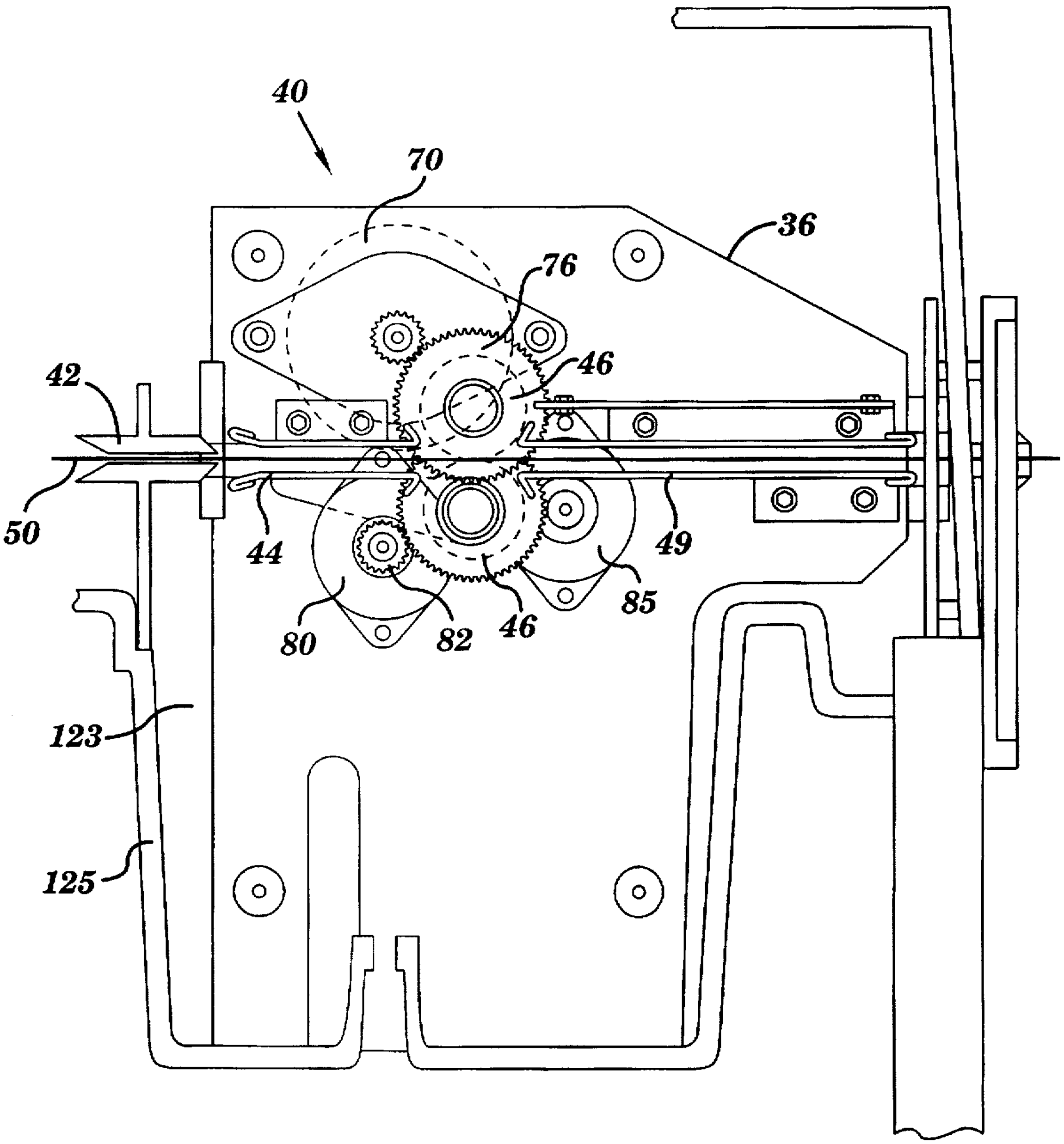
FIG. 5 is a partial sectional view of the drive mechanisms for the rollers, input door and output door.

The drive mechanism for the output door 49 is shown in FIGS. 4*a*, 4*b* and 5. The output door drive stepper motor 80 is mounted to the buffer housing 36 by conventional means (not shown) with its rotational axis parallel to the rotational axis of drive rollers 46. The output door drive motor 80 has a pinion 82 mounted to its shaft. A gear 84 is rotatably supported by the drive roller shaft 86, such that it can rotate freely upon it. A bracket 89 is fastened to the gear 84 by fasteners 88. The bracket 89 supports the output door 49, such that when the output door drive motor 80 is on, the pinion 82 drives the gear 84 and the attached bracket 89, causing the opening or closing of the output door 49 depending on the direction of rotation of the stepper motor 80. The operation of the input door drive mechanism is essentially the same as the output door drive mechanism.

Figure 7:
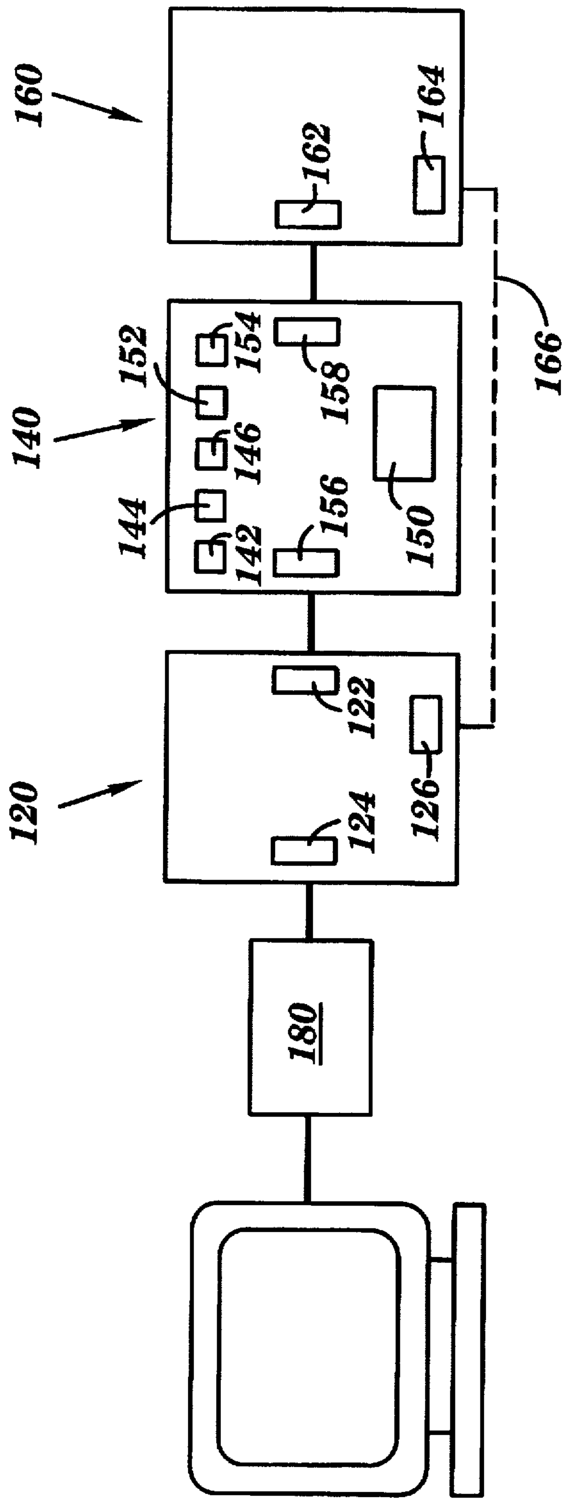
FIG. 7 is a diagrammatic view of an electronic prepress system including a control system and communication network.

Shown in FIG. 7 are the electronic controls for the sensors and motors of the buffer 40 within the buffer controller generally referred to by reference numeral 140. Motor controls for the input door drive motor 85, output door drive motor 80, and roller drive motor 70, are indicated at 142, 144, 146, respectively. These control the start and stop, direction of rotation, rate of rotation, and number of steps rotated on each motor, and work in cooperation with microprocessor 150 which stores certain control sequences in memory. Media sensor driver/receiver 152 and door sensor driver/receiver 154, receive and process signals from the input and output media sensors 32, 33 and the input and output door sensors 31, 35 and also work with microprocessor 150.

The communication network between the imagesetter 20, the buffer 40 and the processor 60 includes an imagesetter controller, generally referred to by reference numeral 120, the buffer controller 140, and a processor controller, generally referred to by reference numeral 160 which are connected in series by interface communication modules. The imagesetter controller 120 has two interface communication modules 122, 124 that communicate with the RIP 180 and with an interface communication module 156 in the buffer controller 140 respectively, to exchange information. Such control information is exchanged relating to length of film 50 in the buffer 40, length of the next image, resolution of the RIP image indicating film travel speed, and the operating state of the processor 60. The buffer controller 140 has a second module 158 that in turn communicates similar information with a module 162 in the processor controller 160. The buffer controller 140 working in cooperation with microprocessor 150, passes information between the imagesetter controller 120 and the processor controller 160.

An important feature of the invention is the buffer 40 has only a single pair of rollers. The control and operation of the drive rollers 46 and a communication network between the buffer 40, imagesetter 20 and processor 60, enable the buffer 40 to successfully absorb the speed differential between the imagesetter 20 and processor 60 using a single pair of rollers.

The operation of the buffer system with the communication network and electronic controls is as follows. The imagesetter controller 120 communicates with the buffer controller 140 through interface communication modules 122 and 156 respectively to determine the status of the buffer input bin 37. When the input bin 37 is ready, a signal is passed from the buffer controller 140 to the imagesetter controller 120 to actuate the film transport system 26 to deliver and feed the leading edge 52 of the film 50 into the buffer 40 at the speed of the imagesetter 20, which is a stored sequence initiated by the microprocessor 150.

Input media sensor 32 senses the leading edge 52 of the film 50 entering the drive rollers 46.

After the input media sensor 32 indicates the film 50 is entering the nip 34 a sequence of steps occurs to form the preliminary slack loop. First the buffer controller 140 sends a message to the imagesetter controller 120 to start measuring how much film is moving into the buffer 40. Using the resolution of the image being imaged, and the number of scanlines being imaged, the imagesetter controller 120 calculates and measures the distance being traveled until a predetermined limit is reached. The predetermined limit will provide a sufficient amount of slack to prevent the image from being disrupted when the film 50 is grabbed by the motion of the drive rollers 46. The imagesetter controller 120 then signals the buffer controller 140 which activates the roller motor control 146 through microprocessor 150 to start the rollers 46 at the speed of the imagesetter. A portion of the preliminary slack is pulled in between the drive rollers 46 and the film 50 is advanced until it reaches the output media sensor 33, which having sensed the leading edge 52, signals to stop the drive rollers 46.

The imagesetter controller 120 passes information from the RIP 180 to the buffer controller 140 concerning the resolution of the each image, which dictates the speed at which an image will move through the imagesetter 20. The information is passed through the microprocessor 150 to the roller motor control 146.

The drive rollers 46 will start rolling at the same speed at which the imagesetter 20 is operating such that the film 50 is grabbed between the drive rollers 46, but not pulled on thereby disrupting the ongoing imaging at the image point 10 (FIG. 1*a*).

Alternatively, to drive the drive rollers 46 at the speed of the imagesetter 20, the roller drive motor 70 is synchronized to match the speed of the imagesetter 20 by using an encoder 15 located in the imagesetter 20. The encoder 15 sends pulses through the imagesetter controller 120 to the buffer controller 140 through interface communication modules 122, 156. The roller motor control 146 receives the pulses and thereby duplicates the speed at which the film 50 is moving in the imagesetter 20.

When the film 50 passes through the drive rollers 46 and reaches the output media sensor 33 (FIG. 1*a*), the media sensor driver/receiver 152 processes a signal to the input door motor control 142 and to the roller motor control 146 through the microprocessor 150. Input door drive motor 85 is actuated, thereby opening the input door 44 to the input bin 37, and the roller drive motor 70 is switched off stopping the drive rollers 46.

Communication occurs next between the communication interface modules 158, 162 of the buffer controller 140 and the processor controller 160. The buffer controller 140 checks whether the processor 20 is ready to process the sheet 55. The processor sensor 62 senses if there is film 50 present or not and conveys the message to the buffer controller 140. If the processor 60 is ready, the buffer controller 140 actuates the buffer drive rollers 46 through the microprocessor 150 to feed the sheet 55 into the processor 60. If the processor 60 is not ready, the buffer controller 140 tells the imagesetter controller 120 to wait to cut. This exchange of information passes from the processor controller 160 to the buffer controller 140 to the imagesetter controller 120, due to the controllers being connected in series.

The drive rollers 46 are actuated in response to a cut being made by the imagesetter 20 and hence the trailing edge 54 entering the buffer 40, and in response to the ready signal from the processor 60. A processor input sensor 62 senses the film 50 entering the processor 60. A signal is sent to the buffer controller 140 through interface communication modules 162, 158, indicating that it has the sheet 55. Therefore, microprocessor 150 initiates a sequence to output door motor control 144 such that output door drive motor 80 opens output door 49. Then the drive rollers 46 transport the sheet 55 from the input bin 37 to the output bin 39 at a speed much faster than that of the processor 60 thereby forming a slack loop of film 50 as viewed in FIG. 1*b*. Simultaneously, the processor 60 removes the sheet 55 from the output bin 39.

The input media sensor 32 detects the trailing edge 54 of the sheet 55 as it leaves the input bin 37. Subsequently, the trailing edge 54 passes the output media sensor 33, the media sensor driver/receiver 152 activates the input door motor control 142 and the roller motor control 146 through the microprocessor 150, such that the input door drive motor 85 closes the input door 44, and the drive rollers 46 are stopped. The signal also relays a message from the buffer interface communication module 156 to the imagesetter interface communication module 122 that the buffer 40 is ready for a new sheet 55.

When the processor 60 has removed all the film 50 from the output bin 39, the processor input sensor 62 senses there is no film 50 present. Consequently, the processor interface communication module 162 tells the buffer interface communication module 158 that it is ready for the next piece of film 50 and the microprocessor 150 initiates a sequence to output door motor control 144 to close output door 49.

There are two modes of operation of the imagesetter 20. Referring to FIGS. 1*a*, *b*, *c*, 2, and 2*a*, *b*, in the first mode, several images are recorded onto one length of film 50 so as to use the buffer's full capacity. In this mode, the imagesetter controller 120 determines when to cut the film 50 from the web 22 and form a sheet 55 that does not exceed the buffer maximum. To do so, the imagesetter controller 120 checks at the start of each image whether the next image will fit into the buffer 40 or not.

In the first mode of operation, the drive rollers 46 take up the leading edge 52 of the film 50 at the speed of the first image of a series of images to be formed on one sheet 55. Then the leading edge 52 is held in place as the incoming images form a slack loop in the input bin 37, until the series of images is complete and the sheet 55 is cut from the web 22.

To determine if the next image to be recorded onto the film 50 will fit into the buffer 40, and where to cut, the microprocessor 150 computes the length of film 50 that has passed from the imaging point 10 into the buffer 40. Before the start of the next image at the imaging point 10, the RIP 180 and the imagesetter controller 120 exchange information through the communication interface module 124. The length of the next image to be exposed is passed from the RIP 180 to the imagesetter controller 120 and it is added to the length of film 50 measured by the microprocessor 150 that is already in the buffer 40. The resulting total is compared to the buffer maximum value. If the total is below the buffer maximum, the imagesetter 20 starts the next image, adding onto the length of film 50 in the buffer 40. Also included in the computed total is the length of exposed film between the image point 10 and the cutter 16, which has not yet been measured by the microprocessor 150, but will be fed into the buffer 40 after the cut is made. If the total is above the maximum, the film 50 is advanced a predetermined amount so that the end of the image moves from the image point 10 to the cutter 16, and is cut. It is also an option of the imagesetter 20 to continue imaging as the film 50 is advanced to the cutter 16, so as not to waste unexposed film between images, for example, when additional RIP images are waiting to be recorded on the next sheet. This option will be described in the second mode of operation.

The microprocessor 150 could also be used in coordination with the encoder 15 to ensure accuracy in the calculations, i.e. ensure the film 50 moved the computed length. The encoder 15 could be located in either the imagesetter 20 or the buffer 40. Similarly, the microprocessor 150 could be in either the imagesetter controller 120 or the buffer controller 140.

When a first image size is too small for the buffer 40, and the next image size when added to the first image size is too big for the buffer 40, the imagesetter controller 120 advances the end of the first image the appropriate amount to meet the required buffer minimum without adding on the next image.

Referring to FIG. 2*a*, an example of several images exposed on a web of film 50 is illustrated. There are four exposed images 58 of varied lengths on one sheet 55. The leading edge 52 of the sheet 55 is equal to the length between the imaging point 15 and the cutter 16, shown in FIG. 1*a*, due to advancement of the previous image to beyond the cutter 16. The leading edge 52 always procedes the trailing edge 54 through the buffer 40, and into the processor 60. The trailing edge 54 and the unexposed areas 56 between images, or the interimage space, are arbitrary lengths selected by the operator which may be much smaller than the length of the leading edge 52.

In the second mode of operation of the imagesetter 20, a cut is made after each image providing the image is of a minimum required length which is governed by the spacing of the rollers handling the film. Referring to FIG. 1*a*, it can be seen that the minimum lengths are the distance between the cutter 16 and the output media sensor 33, and between the drive rollers 46 and the processor rollers 64. The lengths of the images may vary from one to the next resulting in varied sheet lengths when the images are cut, as pictured in FIG. 2*b*.

In the second mode, at the end of each image the film 50 is advanced a small selectable amount at the imaging point 10, forming a gap 59 or an interimage space of unexposed film 50, as a designated cutting location. When the next image is started, the gap 59 will advance toward the cutter 16. To determine when the gap 59 will arrive at the cutting point, the RIP 180 tells the imagesetter controller 120 the size of the next image. The microprocessor 150 calculates the number of scan lines of the next image that will have to be imaged in order to move the center of the gap 59 to the cutter 16. As the next image is started, the calculated number of lines are imaged until the gap 59 arrives at the cutter 16. The imaging is suspended temporarily to cut at the approximate center of the gap 59, indicated by dotted line 57 in FIG. 2*b*. The imaging then resumes to complete the current image. This method can also be used in the first mode of operation when cutting between consecutive sheets of multiple images, to avoid a large leading edge on the next sheet.

In the second mode, if an image size is below the buffer minimum, the imagesetter controller 120 will advance the end of the first image the appropriate amount to meet the required buffer minimum and then the sheet will be cut from the web.

In a general application of the invention, material which is precut into uniform length sheets is used such that the precut sheets pass one at a time through the buffer. In this embodiment no cutting is necessary, but may be done if so desired.

In an alternative embodiment, the imagesetter controller 120 has a third module 126 that communicates with the module 164 in the processor controller 160 as indicated by a dotted connecting line 166 in FIG. 7. This communication network enables the three controllers 120, 140, 160, to exchange status information, report errors, indicate jamming, etc., directly to one another without having to pass through the buffer controller 140.

In yet another embodiment, the imagesetter controller 120 and the buffer controller 140, or the processor controller 160 and the buffer controller 140, form a single electronic controller that has sub modules, resulting in a direct communication link between the imagesetter 20 and the processor 60.

In a preferred embodiment, the buffer 40 is integral with an imagesetter 20, hence the name internal buffer. The buffer 40 is designed to fit in the space of and replace a take-up cassette of the imagesetter 20 such that the two can be used interchangeably if desired. Shown in FIG. 5 is the feature of the invention that integrates the buffer 40 into the imagesetter 20 to form one component. The buffer 40 is nested within a space 123 that is defined by an internal housing 125 of the imagesetter 20. This space 123 exists within the imagesetter 20 for the take-up cassette that is used to hold the entire wound length of exposed media in the prior art. The buffer mechanism 40 has the same dimensions as the old take-up cassette, thus making it possible to replace the take-up cassette and integrate the buffer 40 internally into the imagesetter 20. This reduces the number of components in the photographic imaging and developing system and saves floor space. Alternatively the buffer 40 can be integrated with the processor 60 in a similar manner. In both cases, although the buffer fits in the space of the take-up cassette, the open space below the housing in which the buffer is nested, is used to accommodate the slack loops of film.

What is claimed is:

1. An apparatus for buffering movement of separate sheets of media each with a leading edge and a trailing edge, between a first machine operating at first speed and a second machine operating at second speed, comprising:

(a) a feeding device provided by said first machine for feeding the leading edge of a first sheet of media into a buffer at said first speed; and, (b) a single pair of drive rollers in constant rolling contact with each other for grabbing said leading edge of said first sheet of media at said first speed and holding said leading edge of said first sheet while said feeding device feeds the first sheet of media into a first open space in said buffer, said single pair of drive rollers then advancing said leading edge of said first sheet of media out of said buffer to said second machine at said second speed, and upon receiving a signal from said second machine, said single pair of rollers then advances said first sheet of media from said first open space to a second open space at a third speed which is faster than said second speed while said leading edge of said first sheet of media is continuously advancing out of said buffer and into said second machine at said second speed.

2. The apparatus of claim 1 wherein said first machine includes a cutter and said sheets are cut from a continuous web.

3. The apparatus of claim 1, further comprising a communications network between said first machine, said buffer and said second machine and wherein, upon completion of advancing said first sheet of media from said first open space to said second open space a signal is sent from the buffer to the first machine to advance a leading edge of a second sheet of media to said single pair of drive rollers while said first sheet of media is advancing out of said buffer to said second machine at said second speed.

4. The apparatus according to claim 3 further comprising an input sensor for sensing an edge of a sheet of media as it enters said single pair of rollers and an output sensor for sensing an edge of a sheet of media as it exits said single pair of rollers and wherein said input sensor and said output sensor provide a signal to a buffer controller which receives signals from said first machine and said second machine through said communication network.

5. The apparatus according to claim 1 wherein said first machine is an image exposing device operating at said first speed and said second machine is a photo-chemical processor operating at said second speed and wherein said second speed is slower than said first speed.

* * * * *